United States Patent [19]
Williams

[11] 3,842,417
[45] Oct. 15, 1974

[54] BISTATIC RADAR SYSTEM

[75] Inventor: Frederick C. Williams, Topanga, Calif.

[73] Assignee: Hughes Aircraft Company, Culver City, Calif.

[22] Filed: Feb. 14, 1972

[21] Appl. No.: 225,804

[52] U.S. Cl............ 343/5 R, 343/100 SA, 343/854
[51] Int. Cl............................ G01s 9/02, H01g 3/26
[58] Field of Search.......... 343/5 R, 112 R, 100 SA, 343/854

[56] References Cited
UNITED STATES PATENTS

| | | | |
|---|---|---|---|
| 2,976,530 | 3/1961 | Werner et al. | 343/112 |
| 3,025,514 | 3/1962 | Alexander et al. | 343/5 R |
| 3,025,520 | 3/1962 | Werner et al. | 343/105 |
| 3,270,336 | 8/1966 | Birge | 343/100 SA |
| 3,273,144 | 9/1966 | Fishbein | 343/5 R |
| 3,510,871 | 5/1970 | Watanabe et al. | 343/100 SA |
| 3,560,985 | 2/1971 | Lyon | 343/100 SA |

*Primary Examiner*—Richard A. Farley
*Assistant Examiner*—G. E. Montone
*Attorney, Agent, or Firm*—Paul H. Ware; W. H. MacAllister

[57] ABSTRACT

A bistatic radar system using separate antennas for transmit and receive and taking advantage of the fact that the net radar resolution depends on the product of the two gain patterns. In one illustrated system of the invention, a low resolution transmitter pattern is combined with an ambiguous high resolution receiver pattern formed of a thinned array of phase controlled radiating elements. The elements are separated by a distance greater than the wavelength of the RF signal. In this thinned array approach, the suppressed receive grating lobes may be placed at alternate nulls of the transmit pattern by spacing the receiver array elements to be approximately one-half the transmitted antenna width. The transmit radar forms a conventional sector scanning antenna pattern that illuminates the forward area and the receiving antenna has elements spaced so they form a multilobe pattern that contains selected spacing of grating lobes. In operation only one of these grating lobes is illuminated by the transmit pattern. The transmit and receive antennas are scanned in synchronism either sequentially or in some jump scan sequence to provide the sector scan display. The system is operable substantially without microwave waveguides along the thinned array by providing a local oscillator signal that is phase shifted to control the antenna pointing.

7 Claims, 22 Drawing Figures

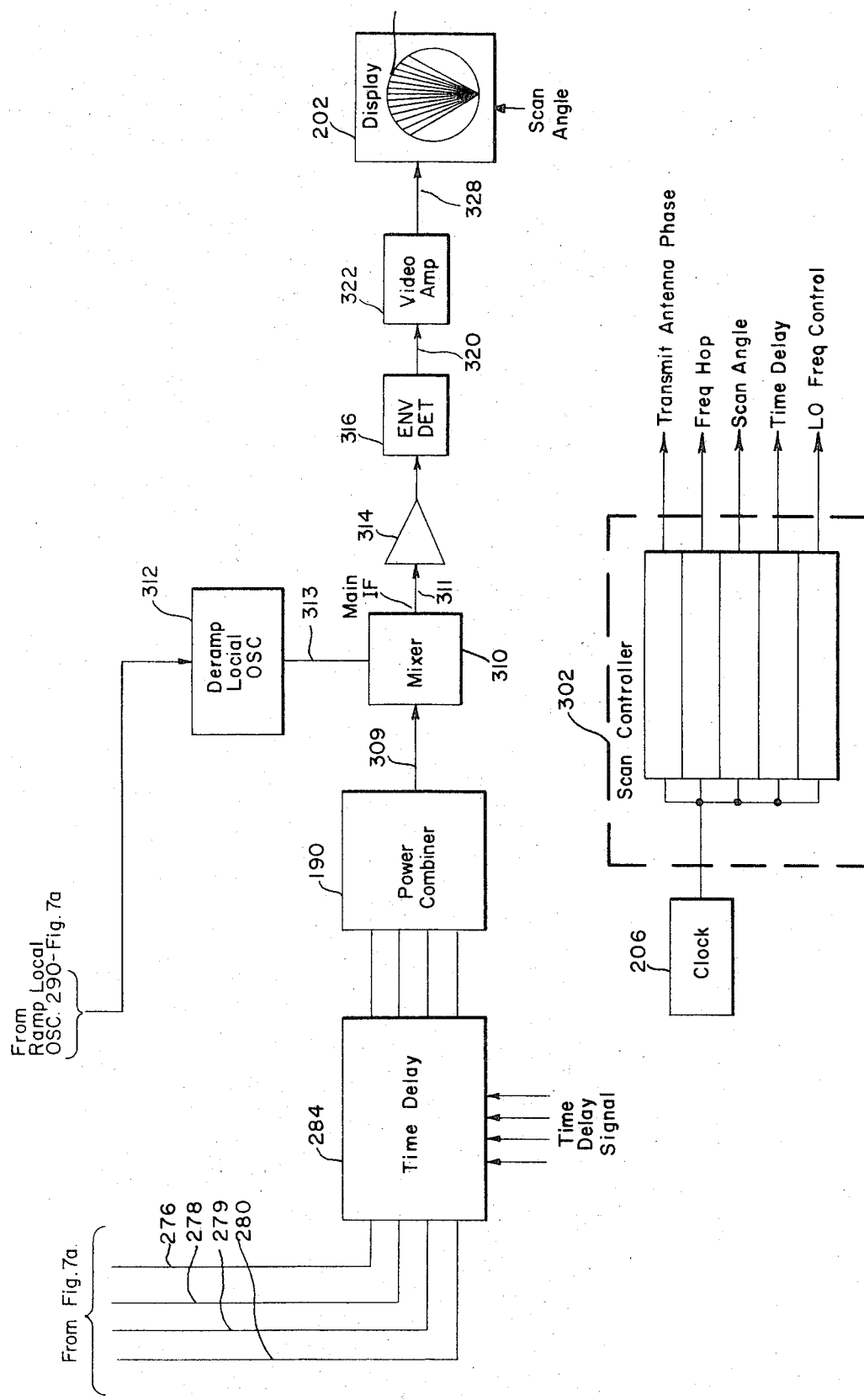

BISTATIC RADAR SYSTEM

BACKGROUND OF THE INVENTION

1. Field of the Invention

This invention relates to radar systems and particularly to a bistatic radar system utilizing a thinned or multilobe receive array concept to provide a high azimuth resolution with a minimum of complexity and equipment.

2. Description of the Prior Art

Prior art techniques for providing a high resolution forward looking radar include systems operating with wing mounted phase scanned array antennas. A wing mounted phase scanned array of the conventional type having a single lobe for transmitting and receiving requires a large number of radiating elements fed by waveguides each with an associated phase shifter and spaced at about one-half of a wavelength of the radar signal. Such electronic scanned wing-tip to wing-tip arrays would provide a substantial performance improvement but have not been implemented, primarily because of economic and installation difficulties in an operational aircraft including the problem of system complexity such as the microwave plumbing required for passing high power microwave signals through the wing and of very large numbers of antenna elements and phase shifters required for scanning with a single beam. It would be a substantial improvement in the art if a high resolution radar system were capable of operating either as a coherent or noncoherent system, and in which the spacing of the electronic array elements was not limited by the wavelength of the radar signal. Further, it would be a substantial advantage to the radar art if an array were provided that could be easily installed in a limited space while requiring a relatively small number of phase shifters and in which the system operated without complex data processing.

SUMMARY OF THE INVENTION

Briefly the bistatic radar system in one arrangement in accordance with this invention provides a highly simplified receive antenna because the antenna radiating elements are separated by a fraction of the transmit antenna diameter rather than a fraction of the radar signal wavelength and because a separate transmit antenna is utilized. The transmit antenna may be a mechanical scan antenna under control of a scan controller which also provides directional synchronization to the receive antenna which may be a phase scan array. In other arrangements utilizing the principles of the invention, the transmit antenna may be either mechanical or an electronic scan type and the receive array may be either a phase or a frequency scan. The receive antenna which is a thinned array has a spacing of antenna elements selected to provide a minimum of elements with the resultant multilobe pattern. For improved system operation the spacing of the receive antenna elements and the spacing of the transmit antenna elements or diameter of a solid antenna are selected so that suppressed receive grating lobes are placed at alternate nulls of the transmitted pattern to substantially suppress the unused receive mainlobes. Because of the small number of receiving elements, a separate radar receive module may be provided for some installations at each radar element, with each receiving element feeding a low noise mixer where the received signal is heterodyned by a phase shifted local oscillator signal. The IF (intermediate frequency) outputs of each subarray of the receive antenna are coherently summed and combined with other summed array outputs. The single output signal is post IF amplified and detected to form the total receiver output signal. By corporately combining the received energy at IF frequencies rather than at RF (radio frequency) the system has minimum signal losses and can employ coaxial cable rather than waveguide. This use of coaxial cable is highly desirable for mounting in systems where space is limited. Other features utilizing the thinned array concept are specified and claimed in Ser. No. 225,807 by Frederick C. Williams filed concurrently herewith.

It is therefore an object of this invention to provide a greatly simplified high azimuth resolution radar system.

It is another object of this invention to provide an improved radar system utilizing a receive antenna having a minimum of array elements and requiring a minimum of mounting space.

It is a further object of this invention to provide an air-to-ground radar system capable of being incorporated into existing radar systems.

It is a further object of this invention to provide a bistatic radar system that provides high resolution of objects in the aximuth dimension.

It is still another object of this invention to provide a bistatic radar system utilizing a separate receiver for each array element.

It is another object of this invention to provide a high resolution forward looking radar that operates without data processing.

BRIEF DESCRIPTION OF THE DRAWINGS

These and other objects, features and advantages of the invention itself will become apparent to those skilled in the art in the light of the following detailed description, taken in consideration with the accompanying drawings wherein like reference numerals indicate like or corresponding parts throughout the several parts wherein:

FIGS. 7a and 7b are schematic perspective drawings of a radar system in accordance with the principles of the invention utilizing a wing mounted frequency scanned array;

DESCRIPTION OF THE PREFERRED EMBODIMENT

Figure 1:
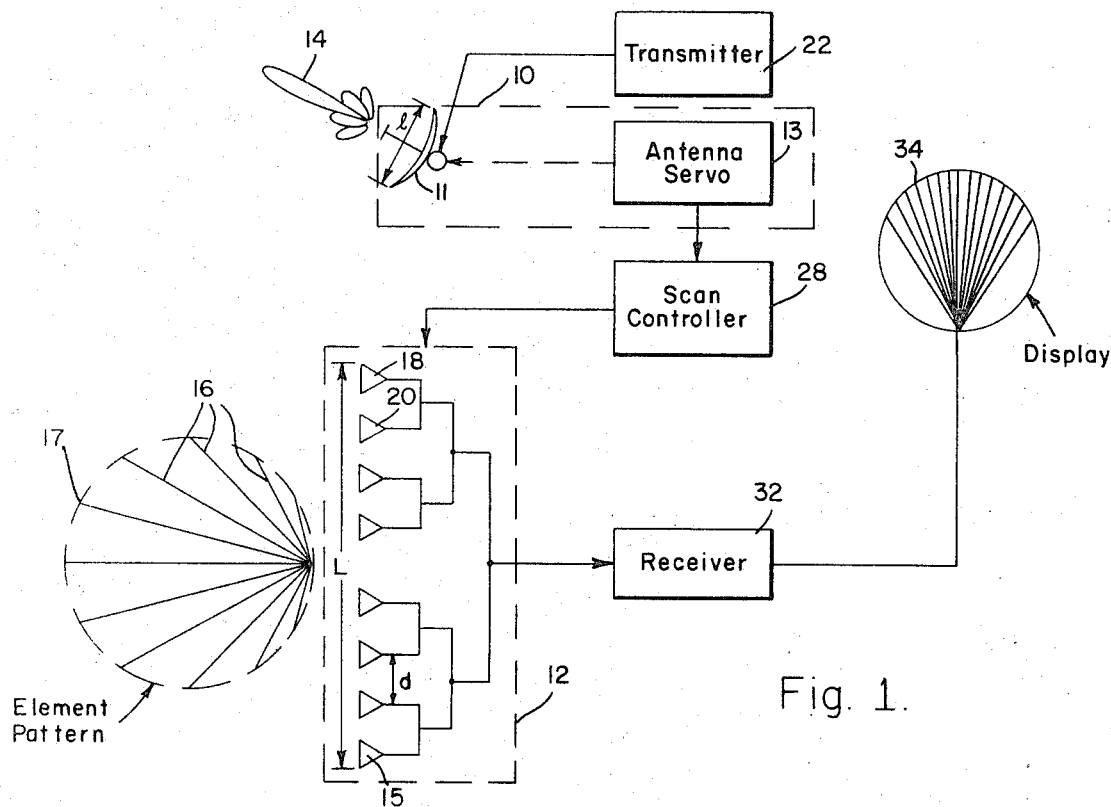
FIG. 1 is a schematic block diagram for illustrating the bistatic radar system utilizing a thinned array in accordance with the invention.

Referring first to FIG. 1, the bistatic radar system in accordance with the preferred embodiment of the invention includes a transmit antenna 10 which may be either mechanically scanned or electronically scanned and a receive antenna 12 which is a thinned antenna array that may be either phase or frequency scanned. Also in accordance with the principles of the invention, the receive antenna may be mechanically or electronically scanned and the transmit antenna an electronically scanned thinned array. Further in accordance with the principles of the invention, both the transmit and receive antennas may be electronically scanned thinned arrays. The transmit antenna 10 in the preferred embodiment is a mechanical scan antenna 11 having a parabollic shaped dish of diameter $l$ and controlled by an antenna servo 13. The receive antenna 12 is an electronically scanned array 15 of length L that may be phase scanned. The transmit antenna 10 has a single lobe pattern 14 of a conventional antenna arrangement. The thinned array receive antenna 12 has a multibeam pattern 16 within the element pattern 17 resulting from the wide spacing of the radiator elements such as 18 and 20. A thinned array may be defined as an antenna array in which the spacing between elements is greater than the wavelength of the RF signal. The receiving antenna because of its length L results in each lobe of the receiving pattern having a substantially good azimuth resolution. The super position of the two patterns 14 and 16 in which only one lobe of the pattern 16 is enclosed by the lobe 14 provides a high resolution azimuth bistatic radar system in accordance with the invention. A transmitter 22 is coupled to the mechanically scanned antenna 10 which scans in azimuth under control of the antenna servo 13. A scan is defined as the entire movement of the antenna across a sector in space, for example. The antenna servo 13 also provides synchronization or master clock pulses to a scan controller 28 that provides control signals to the receive antenna to point a lobe of the multilobe pattern of the receive array in the same direction as the transmit antenna. It is to be noted taht if the transmit antenna 10 is electronically scanned, the controller 28 may control both antennas. The output of the receive array is applied to a receiver 32 that provides amplification and processing of the signal which is then applied to a display 34 which, for example, may be a sector PPI type display. The scan controller 28 may be a read only digital or analog memory providing phase or frequency control signals to the antenna 12 in response to master clock or positional pulses applied thereto from the antenna servo 13 to maintain synchronization of the pointing direction of the two antennas. The transmit antenna 10 may be a mechanical scan antenna, that is, the existing antenna in a radar system which is being modified, for example.

Figure 2:
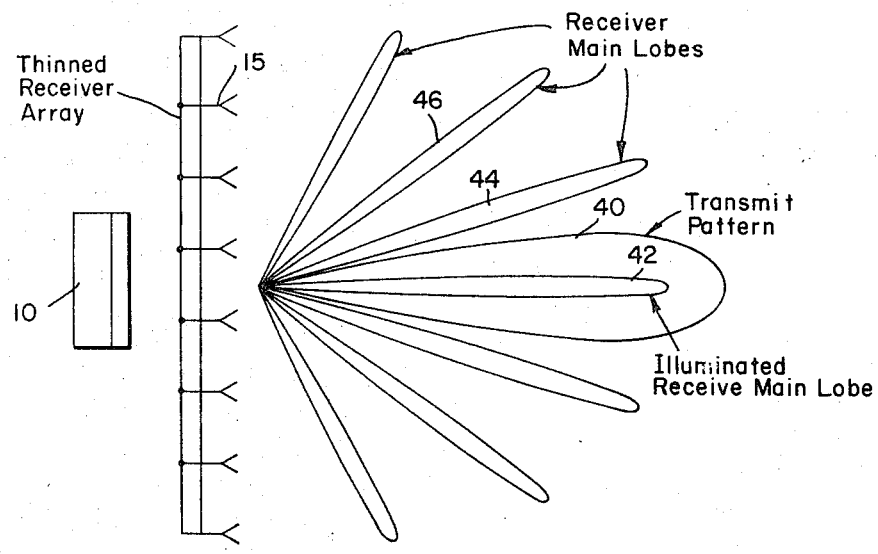
FIG. 2 is a schematic plan view showing the transmit and receive antennas and their patterns for explaining the operation of the system of the invention.

Referring now to FIG. 2, which shows the transmit antenna 10 which may be either a mechanically scanned antenna or an electronically scanned array, and the receive antenna 15 centered on the antenna 10 representative of a thinned, phase scanned, receive array. The transmit pattern is shown by a lobe 40 pointing in a forward direction. The receive pattern is shown by lobes 42, 44 and 46 with the lobe 42 being centered on the transmit lobe 40. The wide spacing of the thinned array receiving elements (at least greater than $\lambda$ the wavelength of the RF radar signal) generates the multilobe receiving pattern which would result in an ambiguity or diversity of the various returns except for the transmit lobe pattern 40 being positioned and maintained coincident with the single lobe 42. The transmit antenna will generate a well known broad beam continuous pattern as shown by the lobe 40 and the relatively long thinned array will generate the multilobe receiving pattern with each lobe having substantially high azimuth resolution. The resultant radar pattern will be the product of two substantially different antenna patterns rather than the square of one antenna pattern as occurs in monostatic or single antenna radar systems.

Figure 3:
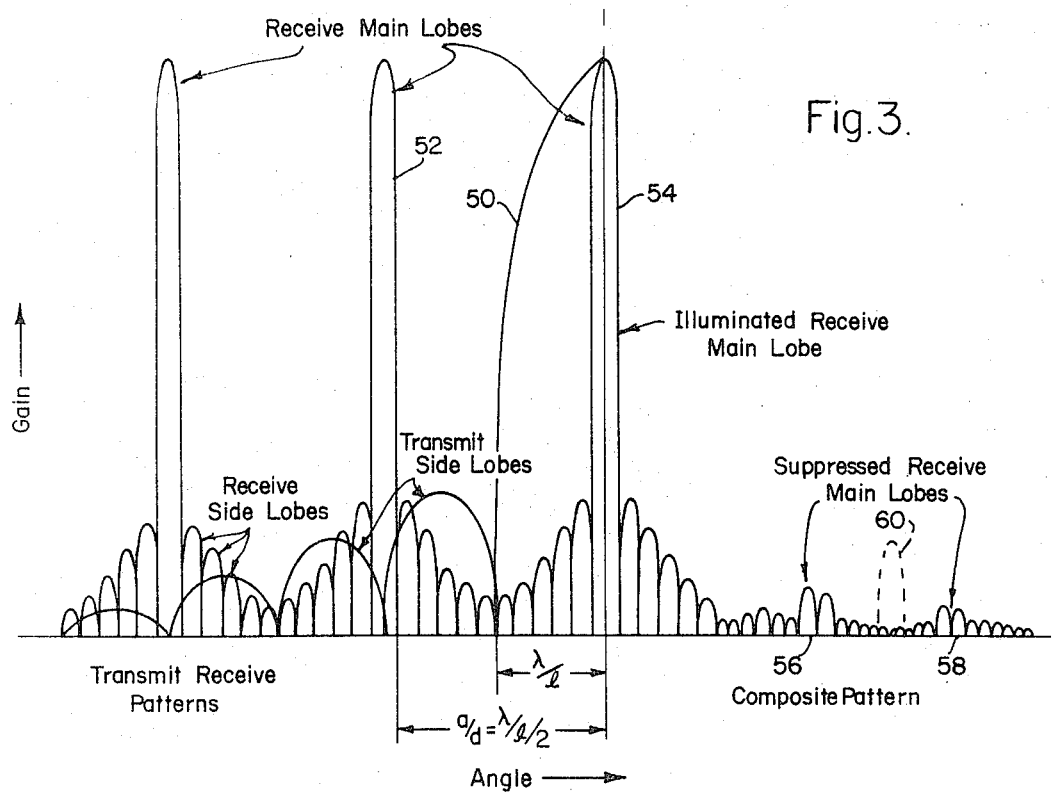
FIG. 3 is a schematic diagram of angle versus gain showing the detailed interrelationship of the transmit and receive antenna patterns of the system of the invention.

The detailed interrelationship of the bistatic transmit and receive patterns may be seen in FIG. 3, in which a transmit pattern 50 and a receive pattern 52 are drawn in substantial detail in the left half of the picture as if there were no interaction in the system. The composite antenna pattern resulting from the producting effect of radar transmit and receive is shown on the right hand side of FIG. 3 and here only the central receive lobe 54 has substantial amplitude at the receiver. One way side lobes appear within the main lobe of the transmit pattern and at the grating or interferometric lobes of the receive pattern. The receive pattern grating lobes are substantially suppressed further by placing them at or near the nulls of the transmit pattern such as at 56 and 58. Other than within the main lobe of the transmitter and at these isolated receive main lobes such as 56 and 58, the resultant pattern has two-way side lobes. Thus, the system of the invention provides a composite antenna pattern which is a product of two substantially different antennas with the null of the transmit pattern selected relative to the receive pattern to substantially suppress the received main lobes, which is in addition to the suppressing of the unused lobes of the receive pattern by the proper positioning of the transmit lobe 50. As can be seen by a dotted lobe 60, a variation of the spacing of the received lobes such as caused by a change of direction during scanning provides imperfect suppression and reception of the lobe. If a mechanical scan transmit and an electronic scan receive antenna are employed, the relative spacing between the receive grating lobes and the transmit nulls changes as the secant of scan angle. However, the suppression or the cancellation as a result of the combination transmit and receive patterns is such that the system provides satisfactory operation. The angle to the first null of the transmit antenna is $\lambda/l$ and the angular spacing of the lobes of the receive antenna is $\lambda/d = \lambda/l/2$ where as may be seen in FIG. 1, $d$ is the spacing of the antenna elements of the thinned array and $l$ is the width of the transmit antenna. The angle subtended by the lobes such as 52 and 54 of the receive antenna is $\lambda/L$ where L is the length of the thinned array (FIG. 1).

Figure 4:
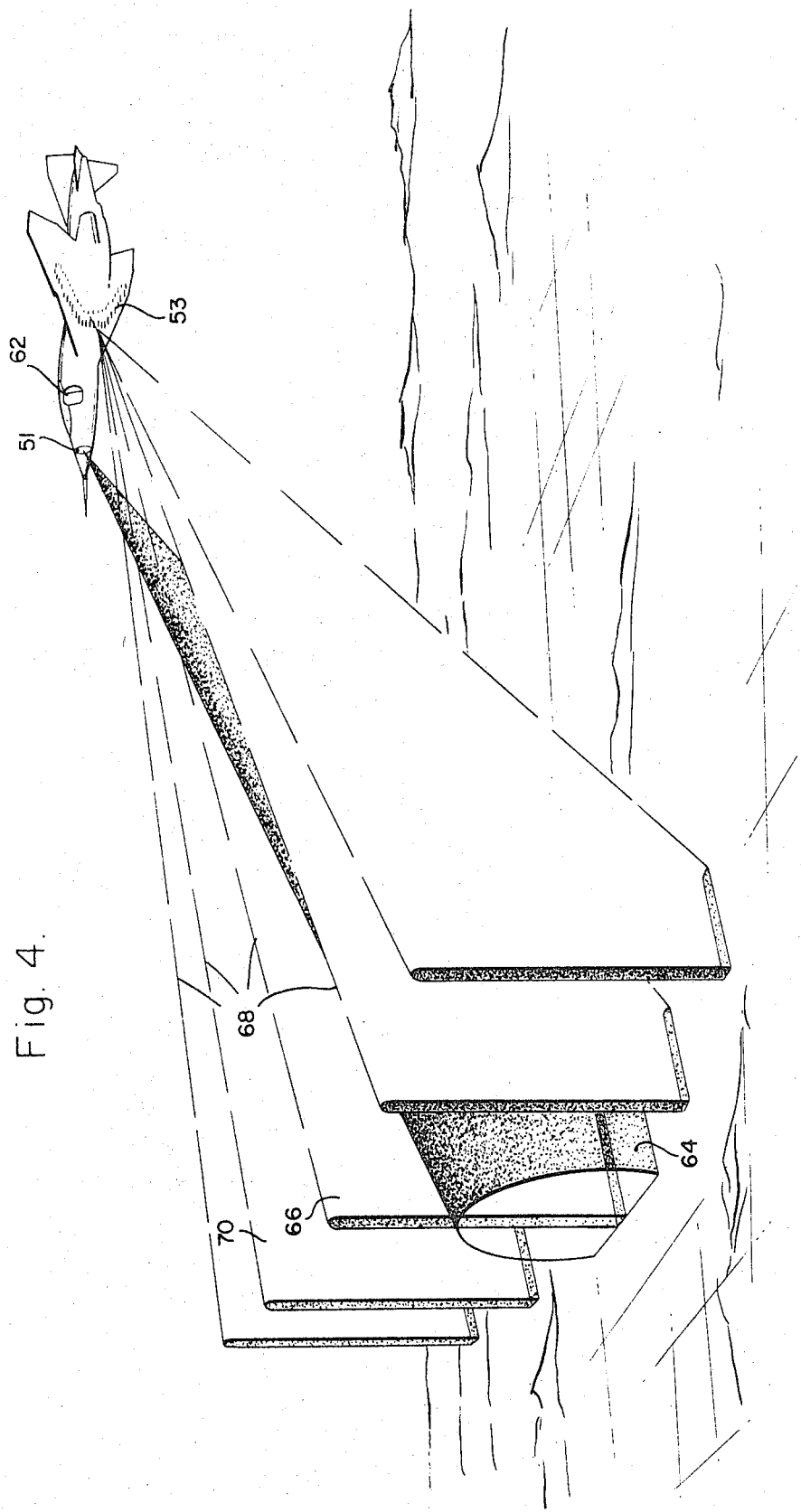
FIG. 4 is a schematic perspective drawing of an aircraft flying over a surface to further explain the transmit and receive antenna patterns of a system in accordance with the invention utilized in an aircraft.

Referring now to FIG. 4, an aircraft 62 is shown with a transmit antenna 51 mounted in its nose and the thinned array receive antenna 53 positioned in the wing substantially back of the leading edge in the illustrated arrangement. It is to be understood that the thinned array 53 may be in the leading edge or at any desirable location on the aircraft. Because the illustrated system is for air to ground operation, a transmit lobe 64 is shown leading from the antenna 51 to the surface of the earth with a receive lobe 66 of a multilobe pattern 68 centered therein. The other lobes such as 70 of the thinned array are not positioned to receive energy from the transmit lobe 64 after reflection from the earth. It is to be noted that the illustration of FIG. 4 shows the lobes such as 70 of the thinned array pattern unattenuated for purposes of illustration but that in some arrangements in accordance with the principles of the invention, the lobes such as 70 are positioned at the nulls of the transmit sidelobes so that they are in effect substantially attenuated. The system of the invention may be utilized for ground to ground operation, ground to air, air to ground or air to air operation, being particularly advantageous when a minimum of equipment is desired while providing a high degree of resolution. The invention is equally applicable to shipboard or land vehicle installations. The transmit antenna in some arrangements in accordance with the invention may be either mechanical or electronic scan.

Figure 5:
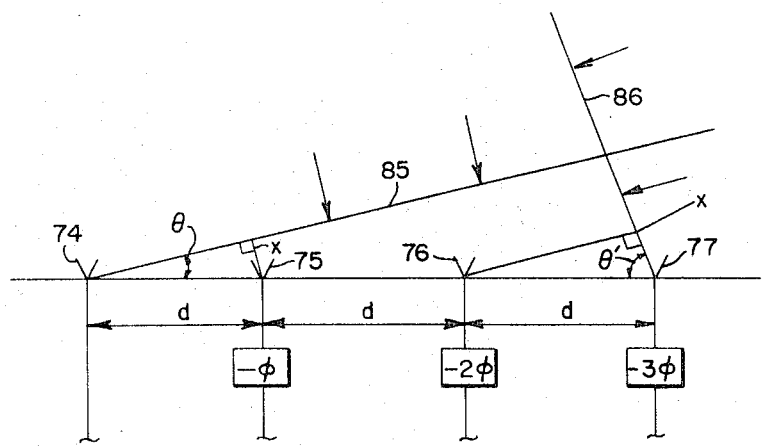
FIG. 5 is a schematic diagram showing a plurality of antenna elements for explaining the effects of spacing the elements of the thinned array at greater than one wavelength in accordance with the invention.

Referring now to the schematic diagram of FIG. 5, a plurality of antenna elements such as 74, 75, 76 and 77 are provided in the thinned array having a spacing $d$ that may be substantially equal to half the width of the transmit antenna 10 or $d = l/2$ for a system in which the receive lobes are at alternate nulls of the transmit sidelobes. For purposes of illustrating the thinned array concept, at a scan angle $\theta$, the antenna elements 74 to 77 have respective phase shifts $0, -\phi, -2\phi$ and $-3\phi$. In normal antenna design there is no abiguity or diversity of lobes because the spacing $d$ is approximately $\lambda/2$ where $\lambda$ is the wavelength of the received or transmitted RF signal. The element spacing $d$ is shown so that two wavefronts 85 and 86 are received from two different directions. The two angles are related by:

$$\text{Sin } \theta + \text{Sin } \theta' = 1$$

The distance X and the spacing $d$ are related by $X = d \text{ Sin } \theta$. For an unambiguous or single lobe array the condition is:

$$d < \lambda/(1 + \text{Sin } \theta)$$

In the system of the invention $d$ may be selected to be larger than $\lambda/(1 + \text{Sin } \theta)$, such as 10 to 20 times larger so that a multilobe pattern is provided. However, a thinned array is any array in which the element spacing is larger than a wave length and the multilobe pattern in the system of the invention may only include two lobes in some arrangements. At the same time, if it is desired to provide cancellation of the peaks, the antenna element spacing is correlated with the transmit antenna so that $d$ may be equal to $l_T/2$ where $l_T$ is the width of the transmit antenna when it is a solid type antenna. If the transmit antenna is a phase or frequency scan array, the element spacing for the transmit antenna is approximately $\lambda/2$ for a single lobe. Again, the element spacing of the receive antenna may be $l_T/2$. (The receive spacing may also be chosen as $l_T/3$ so that receive lobes appear at every third transmit pattern null, as $l_T/4$ for every fourth null or $l_T/n$ for every $n$th null.) The angular width of the receive lobes is $\lambda/L$ where L is the width of the receive antenna, the angular spacing of the lobes is $\lambda/d$ and the angular distance between antenna lobes is larger than $\lambda$. It is to be noted that the system is not limited to any particular number of receive lobes so that any element spacing greater than $\lambda$ may be utilized in accordance with the invention. As an illustrative example, let the transmit antenna be 2 feet long either solid or an array, let the transmit element spacing be $\lambda/2 = $ 0.05 feet ($\lambda = 0.1$ feet, X band). In the example, there are $40 = 2/0.05$ elements in the transmit antenna. With a 40 foot receive antenna, the element spacing in the receive antenna is $l_T/2 = 1$ foot and there are $40/1 = 40$ elements in the receive antenna. With conventional dipole receive pattern as shown in FIG. 1, the receive lobes are 6° apart. It should be noted that with a 40 foot transmit-receive antenna in a conventional system, there would be $40/0.05 = 1600$ antenna elements, a much larger number. Although the illustrated example is for a thinned receive array, it is to be understood that the principles of the invention are equally applicable to utilizing the thinned array for transmit and the conventional antenna for receive. The same consideration as to spacing applies to phase scan and to frequency scan antennas.

For a minimum number of phase shifters with a phase scanned array or a minimum number of antenna elements with a phase or frequency scan array, the following expression may be derived for the transmit antenna length. The number of elements in the transmit antenna plus the number of elements in the receive antenna can be written:

$$l_T/(\lambda/2) + L/(l_T/2)$$

Setting the derivative with respect to $l_T$ equal to zero:

$$d/dl_T [l_T/(\lambda/2) + L/(l_T/2)] = 0$$
$$2/\lambda - 2L/l_T^2 = 0$$

and solving for $l_T$:

$$l_T = \sqrt{\lambda L}.$$

Figure 6A:
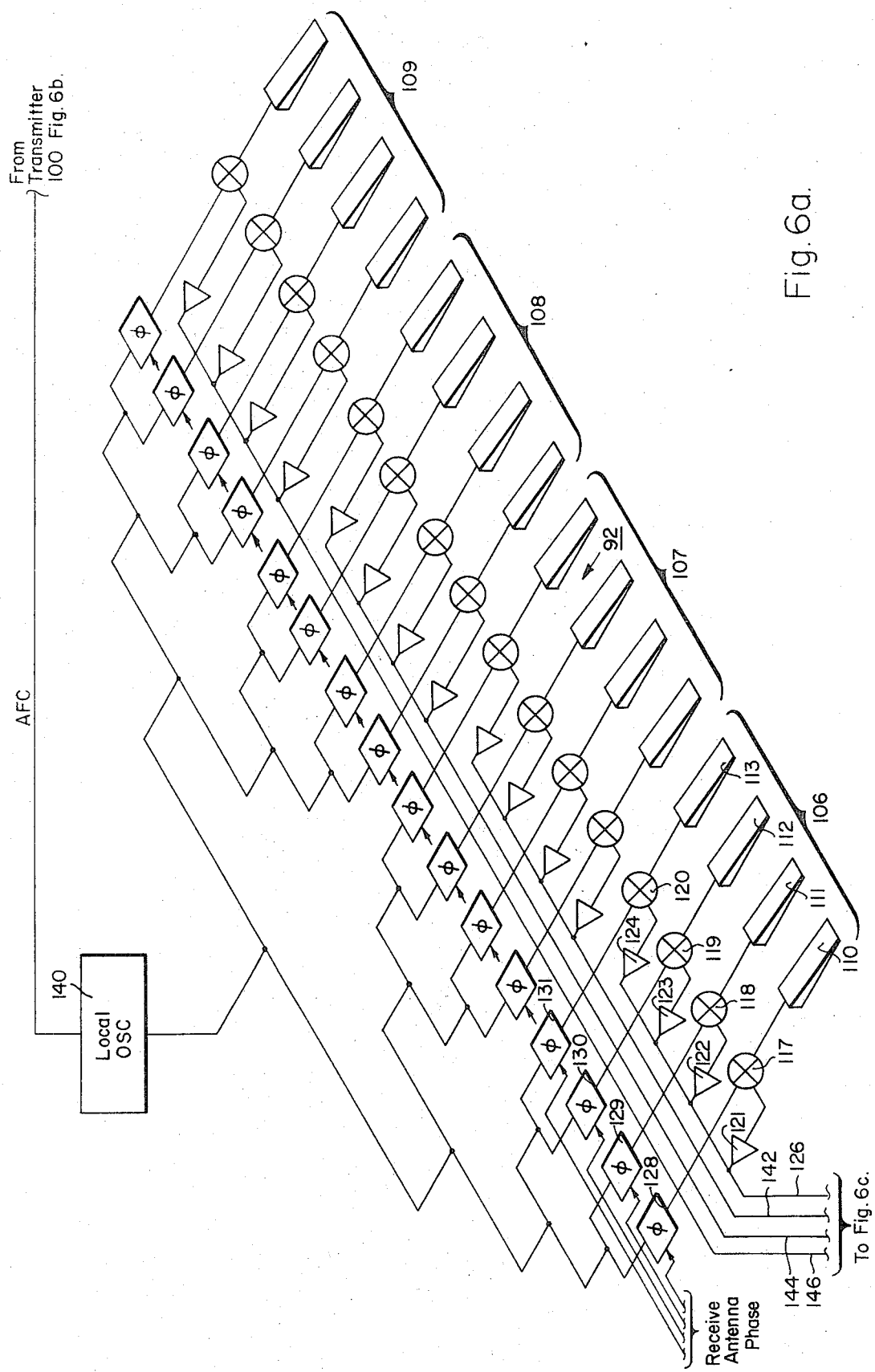
FIGS. 6a, 6b and 6c are schematic perspective drawings of an antenna system in accordance with the principles of the invention utilizing a wing mounted phase scanned array.
Figure 6B:
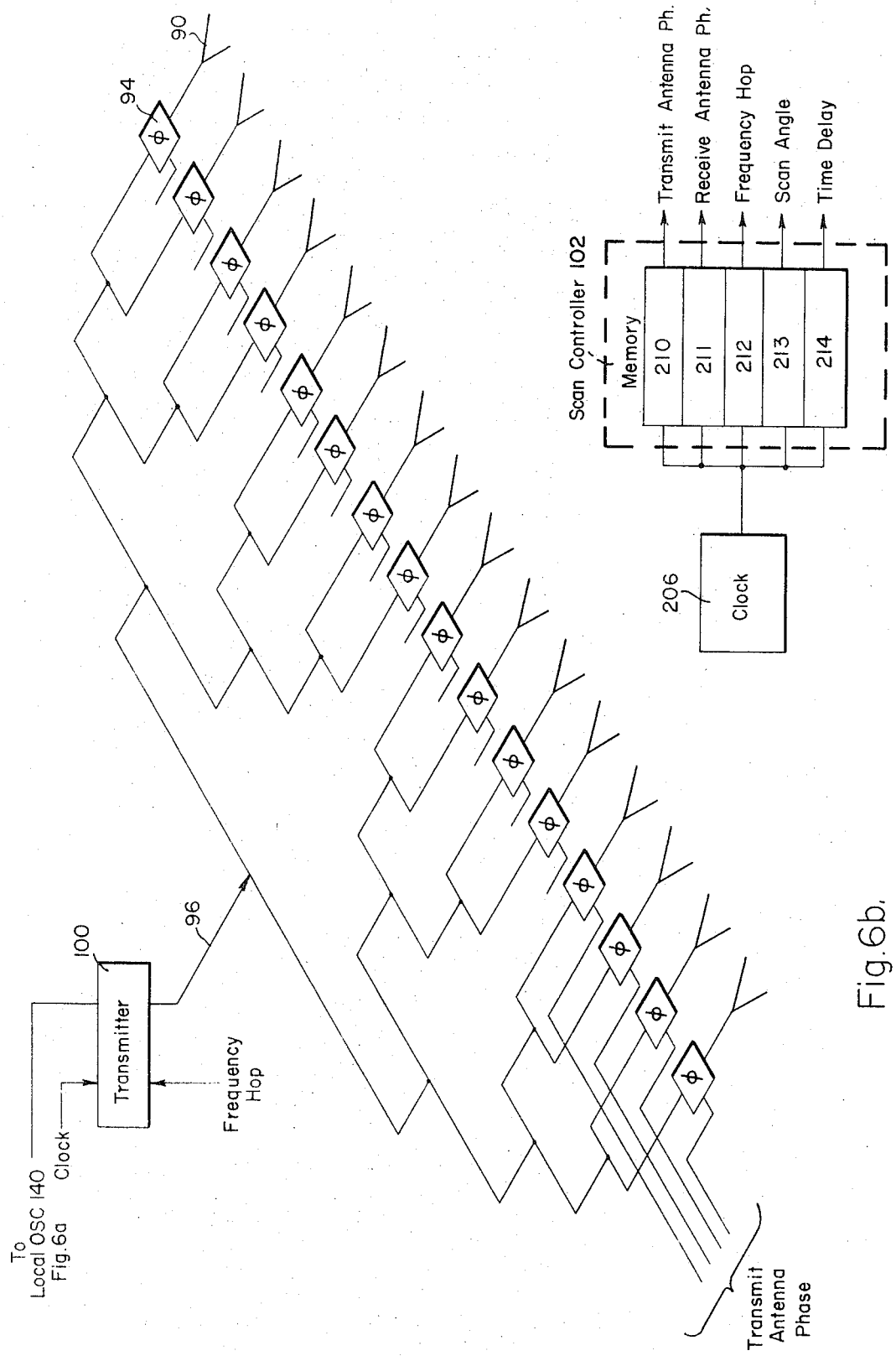
Figure 6C:
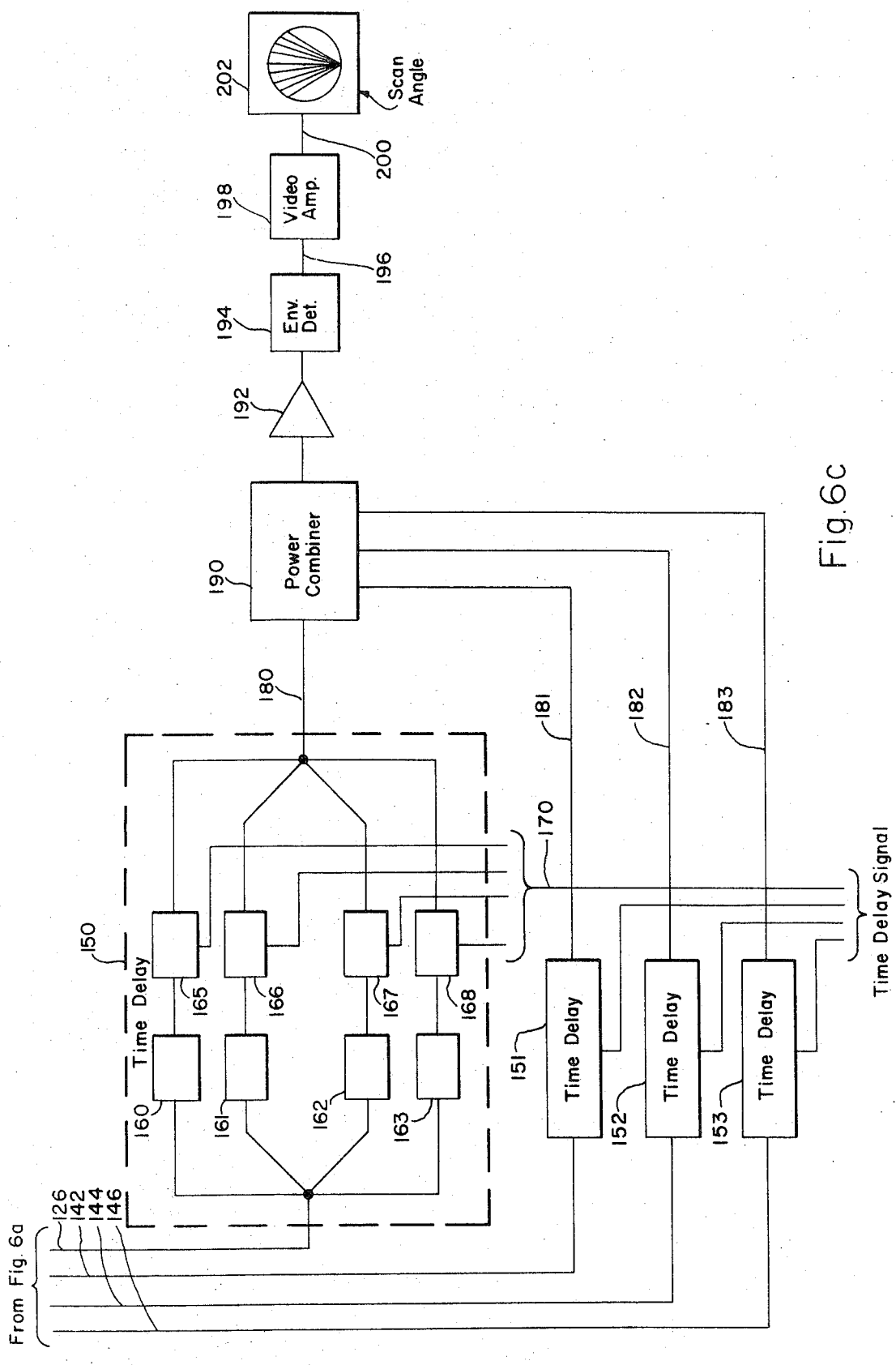

Referring now to FIGS. 6a, 6b and 6c, the principles of the improved radar system in accordance with the invention will be further explained utilizing a phase scanned thinned array antenna for both transmit and receive to illustrate that the principles of the invention are not to be limited to the embodiment of FIG. 1. The system includes a transmit antenna 90 which in the illustrated arrangement is a phase shift array having 16 elements and a receive antenna 92 which is a phase shift array having 16 elements. The transmit antenna 90 includes a plurality of phase shifters 94 coupled to a corporate feed 9 carrying the transmitted pulses from a transmitter 100. The transmit antenna phase control signals are provided by a scan controller 102 which applies proper phase commands to each of the phase shifters such as 94. The thinned array receive antenna 92 includes a plurality of sub groups 106 to 109 of antenna elements such as 110, 111, 112 and 113 of sub group 106 which may be apertures, horns or wedge radiators as illustrated, or any other suitable antenna elements. The antenna elements such as 110 and 111 have a spacing d (FIG. 5) such that a minimum number of elements are required with the resultant plurality of receive lobes. Also, the receive lobes may be selected to appear at the sidelobe nulls of the transmitter antenna pattern. Coupled to each of the antenna elements such as 110 to 113 is a mixer such as respective mixers 117 to 120 in turn coupled through IF preamplifiers such as 121 to 124 to a common line 126. Thus, signals received in each of the sub groups of antenna elements such as 106 to 109 after passing through appropriate mixers are summed at IF in a common line such as 126. In order to provide phase shifting in accordance with the invention, each of the mixers such as 117 to 120 receives phase shifted local oscillator signals from respective phase shifters 128 to 131. A corporate feed is coupled to each of the phase shifters from a local oscillator 140 which receives an AFC (automatic frequency control) signal from the transmitter 100. Thus, it can be seen that the phase shifter losses appear on the local oscillator signal rather than on the wideband receiver radar signals. Although additional local oscillator power may be required, this does not change the signal-to-noise ratio of the radar system. In addition, the local oscillator corporate feed may be constructed of coaxial cable rather than waveguide at a cost of additional local oscillator power. Lastly, it is to be noted that the signals of a subarray are combined at IF rather than at RF frequency. In this arrangement substantially no waveguide is required at the array which may be an aircraft wing section in accordance with the invention.

Each of the other groups of subarrays 107, 108 and 109 are coupled to a different lead 142, 144 and 146. The signals in the leads 126, 142, 144 and 146 are processed to overcome the time delay effects of off-broadside scan angles of the antenna.

Figure 11:
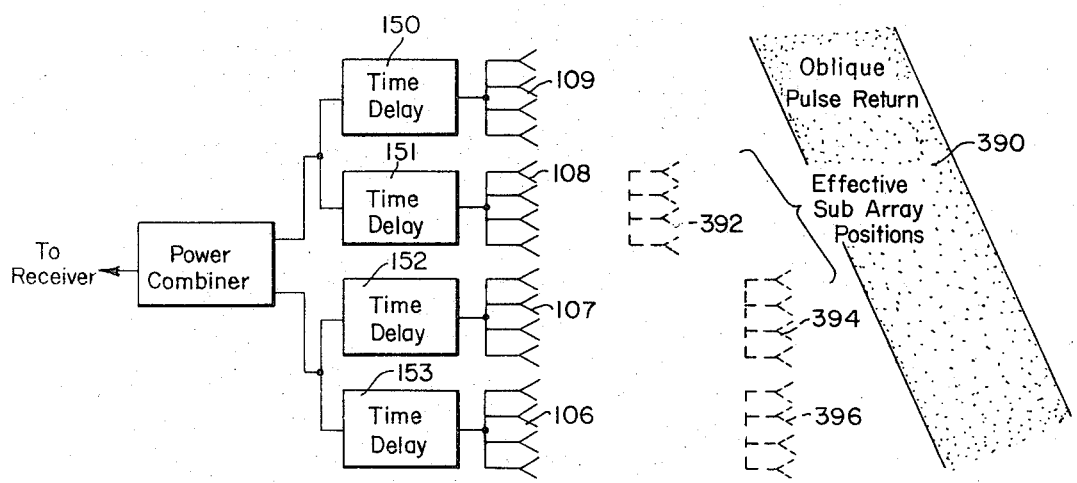
FIG. 11 is a schematic diagram for explaining the time delay compensation that may be utilized with the system of the invention.

Although the antenna may be phase corrected to guarantee coherent addition of the wave train, obliquely returning echoes do not simultaneously illuminate all elements of the antenna (FIG. 11). This problem is overcome by providing a combination of time delay and phase delay in which each element of the antenna is phase steered and the output signals of the elements of each subarray are combined to generate one output signal such as on the leads 126, 142, 144 and 146. The output of each subarray goes through a different switchable time delay 150 to 153 respectively receiving signals on leads 126, 142, 144 and 146. Each time delay circuit such as 150 includes a delay element such as a length of coaxial cables 160, 161, 162 and 163 respectively coupled to switches such as 165, 166, 167 and 168. A time delay signal from the scan controller 102 is applied on composite leads such as 170 to switches 165 to 168 so that a different one is energized as a function of the scan angle of the antenna. After this time delay, the signals are applied through leads 180, 181, 182 and 183 to a suitable power combiner 190 which applies a combined signal through a suitable amplifier 192 to an envelope detector 194. The envelope or video signal is then applied from the envelope detector 194 through a lead 196 to a video amplifier 198. The signal is then applied through a lead 200 to a suitable utilization unit such as a display unit 202 which for illustrative purposes is shown as a sector scan PPI which may receive a digital scan angle signal from the scan controller 102.

The scan controller 102 may be, for example, a suitable memory unit such as a read only memory responsive to a clock 206 and, for example, including memory sections 210, 211, 212, 213 and 214 in which is stored the data for synchronizing the entire system. The transmit antenna phase may come from the memory section 210, the receive antenna phase from the section 211, a frequency hop signal from the memory section 212, which is applied to the transmitter 10 for controlling the transmitting frequency, the scan angle signal from the memory section 213 for controlling the azimuth angle of the display 202 and the time delay control signal from the memory section 214 for controlling the time delay circuits 150, 151, 152 and 153.

Figure 10:
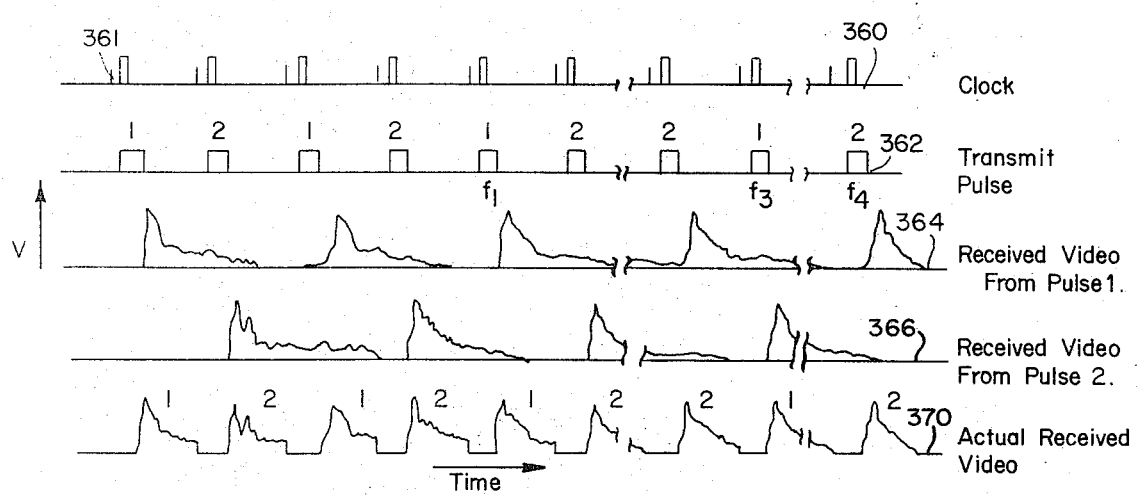
FIG. 10 is a schematic diagram of waveforms of voltage as a function of time for further explaining the operation of the second-go-around reduction system.

The scan controller 102 provides system control by sequentially deriving coded words in response to a clock 206 having a synchronous operation with the transmitter 100. The signals applied to the scan controller from the clock 206 may be adjusted to provide the system changes in the dead time just prior to transmitting each pulse (FIG. 10). The scan controller 102 for the phase scan thinned array system may be conventional or read only memories having coded data therein for synchronizing the entire system. Thus for a 16 antenna element system as illustrated with 256 scan angles, the following words are required:

Transmit Antenna Phase — 16 4 bit phase shift words = 64 bits

Receive Antenna Phase — 16 4 bit phase shift words = 64 bits

Frequency Hop — four frequencies = 2 bits

Scan Angle — 256 scan angles = 8 bits

Time Delay — four time delay switches with four values each = 4 × 2 = 8 bits

Total — 146 bits/scan angle

Total for 256 angles — 37,676 bits and for 4,096 bit chips = 10 memory chips

If parity check is desired, parity bits may be added to the above data words as is well known in the art.

Figure 7A:
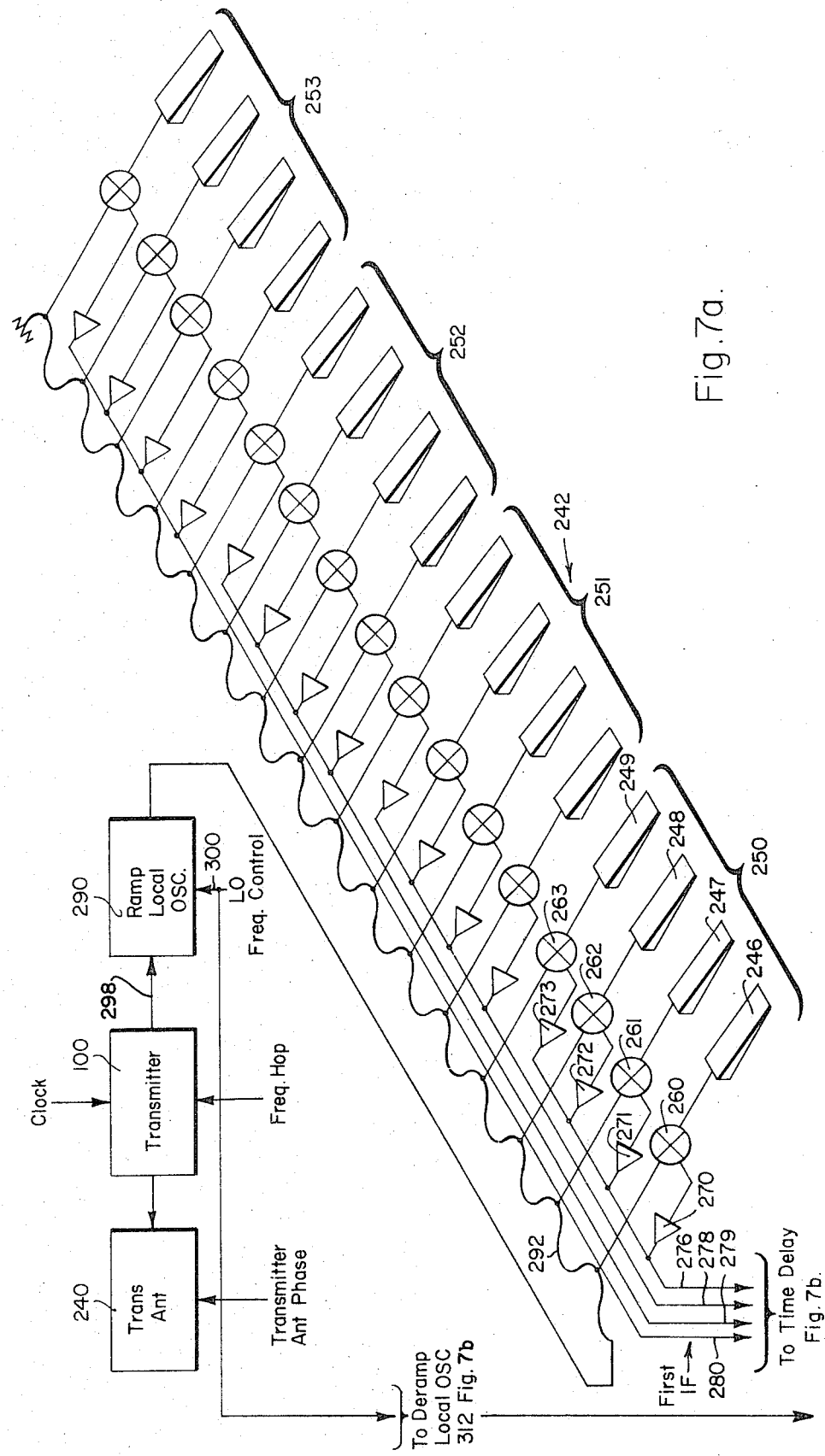

Referring now to FIGS. 7a and 7b which show a system in accordance with the invention utilizing a transmit antenna 240 that may be either a mechanical scan antenna or a phase or frequency scan array. The transmit antenna 240 may be a mechanical scan dish as shown in FIG. 1 which may be desirable when modifying existing aircraft having a mechanical scan antenna in the nose thereof. However, it is to be understood that the system concepts of the invention are not limited to any particular type of transmit antenna but include mechanical scan dish or array antennas, frequency scan arrays and phase scan antenna arrays. A receiving antenna 242 is of the frequency scan array type designed to provide a thinned array operation. The thinned array antenna includes antenna subgroups 250 and 253 with the subgroup 250 including elements 246 to 249. Each of the other subgroups includes similar antenna elements. The signal received by each antenna element 246 to 249 is applied to respective mixers 260 to 263 and after being heterodyned therein is applied as an IF signal through respective amplifiers 270 to 273 to a lead 276. Other groups of mixers from antenna element subgroups 251, 252 and 253 are applied to respective leads 278, 279 and 280 to a time delay unit 284 which may include the time delay circuits 150 to 153 of FIGS. 6c and 11. For providing the frequency scan local oscillator signals, a ramp local oscillator 290 applies signals of changing frequency or increasing frequency to a serpentine feed 292 having a suitable terminating lead at the far end thereof. As is well known in the art, each of the 16 mixers such as 260 to 263 is coupled to a similar point of the serpentine feed 292 which has a length so that the frequency variation provides a phase variation to vary the direction of reception of the antenna elements. The ramp local oscillator 290 receives an automatic frequency control signal on a lead 298 and a local oscillator frequency control signal on a lead 300 from a scan controller 302. The local oscillator frequency determines the antenna pointing direction; the antenna is scanned by providing a set of signals of increased frequency.

The time delay circuit 284 is controlled by time delay signals from the scan controller 302 and the signals are then applied to the power combiner 190 to join the intermediate IF signals into a combined signal which is then applied through a lead 309 to a mixer 310. A deramp local oscillator 312 responsive to the local oscillator frequency control signal on the lead 300 is coupled through a lead 313 to the mixer 310 to remove the frequency scanning excursion provided by the ramp local oscillator 290. Thus the mixer 310 provides a narrow band main IF signal which is applied through a lead 311 and an amplifier 314 to an envelope detector 316 which in turn applies a video signal through a lead 320 to a video amplifier 322. The video signal is then applied through a lead 328 to a suitable utilization unit such as the display unit 202, receiving scan angle signals from the scan controller 302.

The scan controller for the system utilizing frequency scan in the thinned array receive antenna for a 16 antenna element system may store the following words for 256 angles:
Transmit Antenna Phase — 16 4 bit phase shift words = 64 bits
Transmit Frequency (Frequency Hop) — four frequencies = 2 bits
Scan Angle — 256 angles = 8 bits
Time Delay — four time delay switches four values each = 8 bits
L.O. Frequency Control — 256 frequencies = 8 bits Total — 90 bits/scan angle
Total for 256 angles — 22,940 bits (or six chips of 4,096 bits each)
If a parity check is to be utilized, additional bits may be required as is well known in the art.

Figure 8:
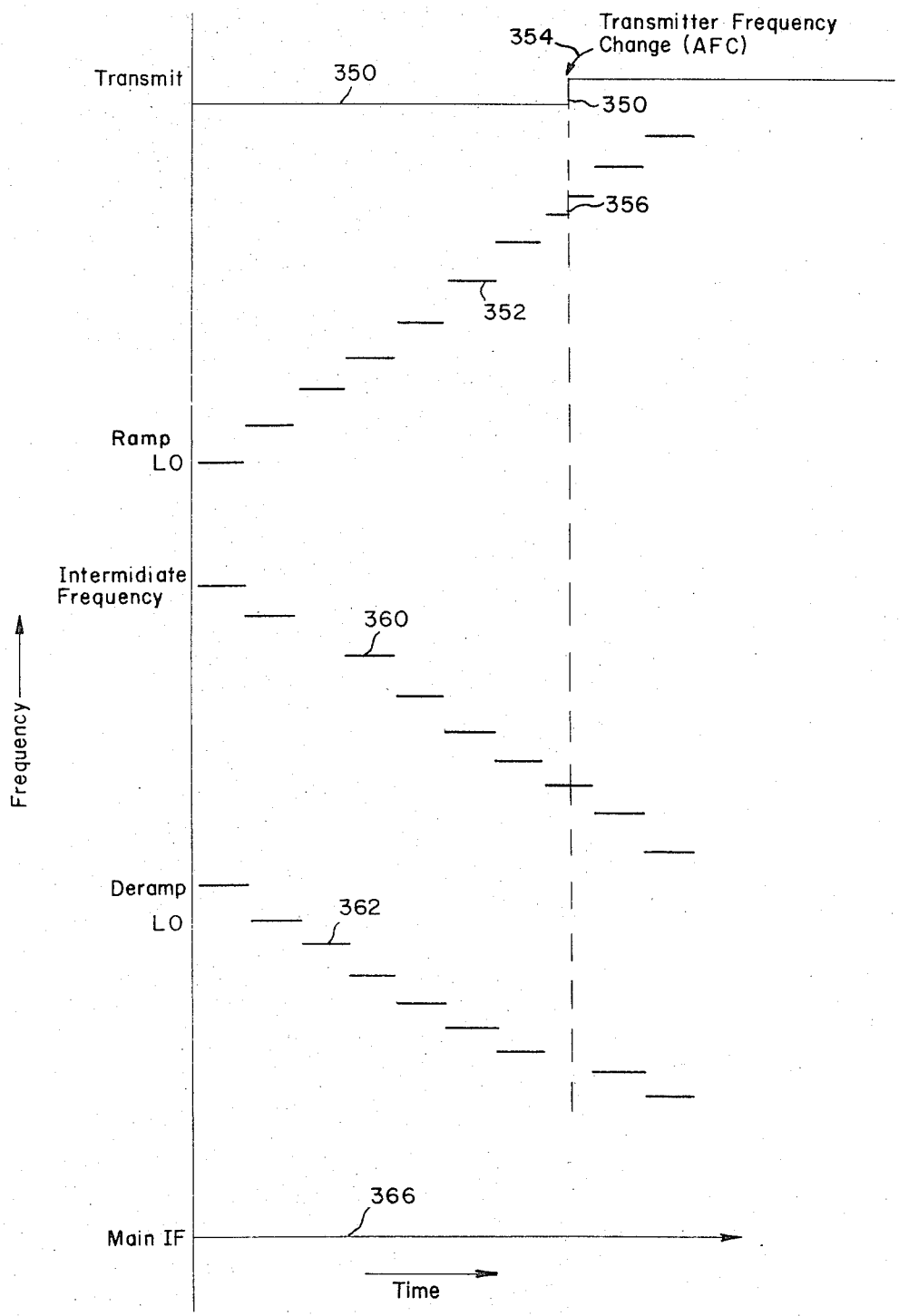
FIG. 8 is a schematic diagram of signals showing time as a function of frequency for explaining the operation of the frequency scanned array of FIGS. 7a and 7b.

Referring now also to FIG. 8, the operation of the system of FIGS. 7a and 7b will be further explained by signals of time versus frequency. The transmitter frequency is indicated by a signal 350 and a local oscillator frequency by a signal 352 having a plurality of ramp steps. At a time 354, the transmitter frequency suffers a change such as by a temperature change. In response to conventional AFC operation, a correction of local oscillator frequency occurs at 356. The first IF signal on the leads such as 276 or 278 are indicated by a signal 360 having a negative ramp being the difference of the transmitter 350 and local oscillator 352 signals. The deramp local oscillator signal on the lead 313 is shown by a signal 362 having the same negative ramp as the first IF signal. The difference of the first IF and the deramp local oscillator is the main IF signal on the lead 311 having a constant frequency as indicated by a signal 366. This frequency control of the thinned array 242 is similar to conventional arrays as is well known in the art and will not be explained in further detail.

Figure 9:
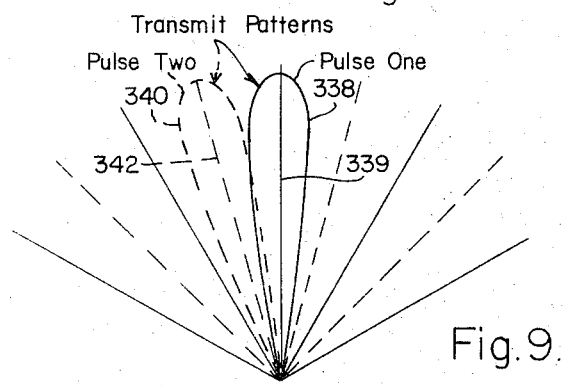
FIG. 9 is a schematic diagram of antenna patterns for explaining the second-go-around reduction that may be utilized with the system of the invention.

Referring now to FIGS. 9 and 10, second go around reduction operation of the systems of FIGS. 6a, 6b and 6c and FIGS. 7a and 7b will be further explained. At high PRFs as is well known in the art, the limited range sweep length restricts the maximum use of the time for range and second go around returns (from large targets at ranges beyond the interpulse interval). These second go around returns contaminate the display by appearing at near ranges after the succeeding pulse has been transmitted. The transmit pattern 338 and the various receiving mainlobes such as 339 in FIG. 9 are shown by solid lines during a first range sweep interval number 1 and during the next range sweep interval number 2 at a transmit lobe such as 340 and receive grating lobes such as 342 are shifted as shown by the dotted lines. This rapid shift implies that both the transmit and receive arrays must be electronically scanned in this case. By controlling the transmitting direction as a result of the scan controller, no energy transmitted on pulse number 1 enters the receiver during range sweep interval number 2, since all received grating lobes are no longer pointing in the previous transmit direction. For pulse number 3 the pattern reverts to the original position or may proceed on to the next grating lobe of pulse number 1. This control is provided by the transmit antenna phase or frequency control words from the scan controller. For elimination of third or fourth go around return or any desired higher order, the antenna lobe positions may advance one-third, one-fourth or any desired fraction of the distance between grating lobes respectively for 3 or 4 pulses or any desired number of pulses before being in a position to receive energy from the first transmission. This second go around reduction technique is normally only required for and is limited to electronically scanned antennas. For mechanically scanned antennas, a lower PRF will suffice to supply the information rate requirement of a mapping radar (one pulse per beamwidth).

Referring now also to FIG. 10, clock pulses of a waveform 360 synchronize the system to provide a transmit pulse of a waveform 362 which is labelled either pulse 1 or pulse 2. The pulses such as 361 indicate the time when the scan controllers may provide signals to the systems. The received video pulse from pulse number 1 is shown by a waveform 364 and the received video from pulse number 2 is shown by a waveform 366 indicating that undesired energy may be received from each pulse if a second go around reduction technique is not utilized. Received video as shown by waveform 370 for the system using the second go around reduction of FIG. 9 is desirable because contamination of each return by second go around returns is eliminated. Pulses such as 361 indicate the clock pulse that is generated to control the scan controllers and provide changes of antenna directions. It is to be noted that for transmitting with a thinned array and receiving with a single lobe pattern, the second go around reduction may be reduced in a similar manner in accordance with the invention.

The image smoothing effects of multiple radar frequencies in a noncoherent radar system are well known in the art. For normal radar operation the frequency is changed on a pulse to pulse basis. However, in the system of the invention, when using electronic scan, as one hit occurs per azimuth direction per scan and since the scans occur about twenty times per second, for example, the frequencies only have to be changed on a scan to scan basis. A mechanically tuned magnetron may be utilized with an electronically scanned transmit antenna to obtain scan to scan image smoothing and may be controlled by continuous tuning. As shown by the waveform 362 of FIG. 10, frequencies $f_1, f_3, f_4$ ($f_2$ not being shown) may be provided each for a different scan.

FIG. 11 shows an illustrative arrangement for explaining the time delay compensation that may be utilized in the system of the invention. At off broadside angles such as indicated by a pulse return wavefront 390, the entire array of subgroups 106 to 109 is not simultaneously illuminated. It is to be understood that the illustrated array is for a phase scan thinned array but is equally applicable to the frequency scanned array. At the off broadside scan angle shown by the wavefront 390, the returning echoes do not simultaneously illuminate all elements of the antenna. Hence a proper antenna pattern will not be achieved with these scan angles even though the elements of the receiving array are properly phased to provide coherent addition of the return. In the system of the invention time delay may be added so that the output of each subarray goes through a switchable time delay such as 150 to 153 (FIGS. 6c and 11) so that the receiving elements are in effect brought to position indicated by 109, 392, 394 and 396 more nearly parallel to the incoming wavefront 390. It is to be noted that the effective subarray positions 392, 394 and 396 are not all parallel to the incoming wavefront 390 but coarsely adjustable time delays provide effective and satisfactory operation. Because the time delay control and the phase shifter control (or frequency of the local oscillator control) are provided by the memory elements of the same scan controller, the correction is performed with highly accurate synchronization with a minimum of equipment.

For the very narrow beamwidths achievable with the system of the invention, as a result of the long antenna length L, the limitations characteristically found on non-coherent MTI (moving target indication) are substantially eliminated. A clutter referenced, noncoherent MTI technique may be used with the radar of the invention with reliable performance.

Figure 12:
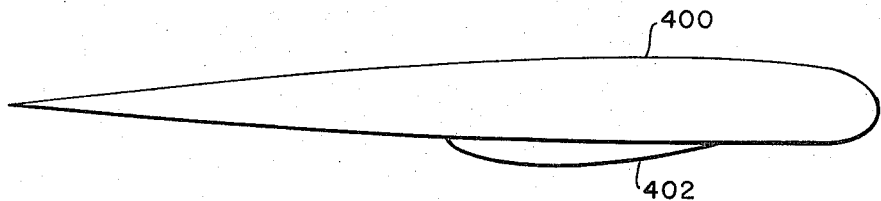
FIG. 12 is a side view of an aircraft wing for explaining a mounting that may be used with the system of the invention.
Figure 13:
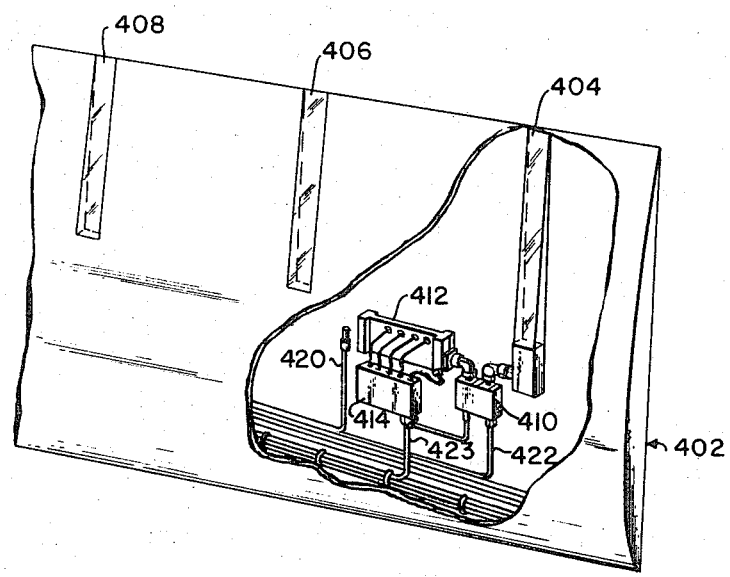
FIG. 13 is a schematic perspective drawing showing a wing installation of the thinned array system utilizing the principles in accordance with the invention.

Referring now to FIG. 12, which shows a cross section of an aircraft wing 400 with the antenna system 402 mounted on the underside thereof. Although the system of the invention is applicable to mounting at any desired position on the wing, the leading edge is often occupied with deicing structure and control structure and installation on the lower surface of the wing results in less interference with aircraft operations. The receive array 402 as may be seen in FIG. 13 may include wedge radiating elements such as 404, 406 and 408 flush mounted at the desired thinned array spacing which, for example, with an eighteen to 24 inch transmitting antenna, may be 9 to 12 inches apart. Each element is coupled to a commercially available balanced mixer-preamplifier 410. The local oscillator signal is distributed through a coaxial line. The local oscillator signal into the mixer is received from a diode phase shifter 412 under control of a diode phase shifter driver 414. Thus it can be seen that substantially no waveguide is required in the wing of an aircraft or in the structure 402 because the mixer is close coupled to the antenna element 404. The aft section of the antenna structure 402 contains the coaxial lines carrying the incoming local oscillator signals and the outgoing IF signals as shown by respective lines 420 and 422. The preamplified IF signal on the leads such as 422 are time corrected in the subarray time delay, combined at IF and amplified in the body of the aircraft rather than in the wing. By providing the phase shift in the local oscillator signal, the signal-to-noise ratio of the system is not degraded and the loss of the local oscillator signal is easily overcome. A composite lead 423 carries the phase control signals and provides power.

Figure 14:
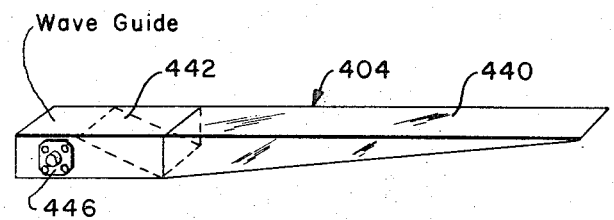
FIG. 14 is a schematic perspective diagram of a wedge radiator that may be utilized with the wing mounted antenna.

Further detail of the radiating element 404, which is an illustrative example of the type that may be utilized for this installation, may be seen in FIG. 14. The element includes a dielectric plastic wedge 440 connected to a section of waveguide 442 through a suitable matching section. The signal output is taken from the waveguide through a suitable connector such as a surface mounted connector 446 having a waveguide to coaxial connector stub. This radiation has been chosen because it can be easily flush mounted to the underside of the extended metal surface.

Figure 15:
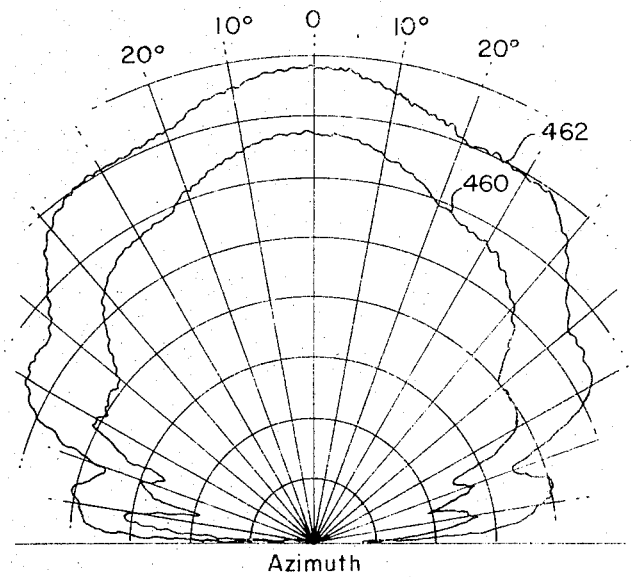
FIG. 15 is a radiator pattern in the azimuth dimension for the wedge radiator of FIG. 14.
Figure 16:
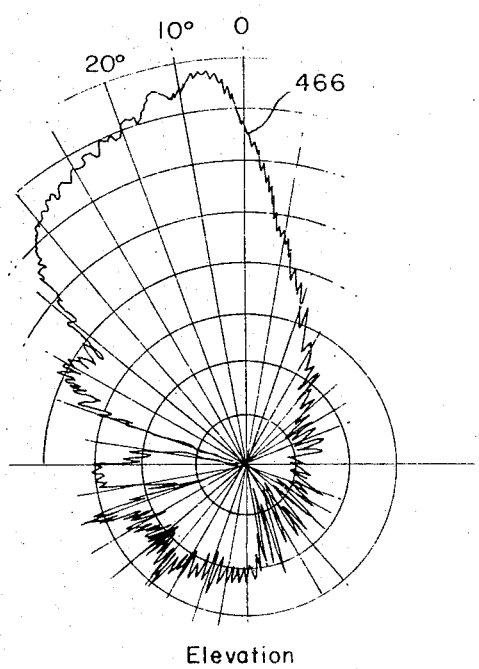
FIG. 16 is a radiator pattern in the elevation dimension for the wedge radiator of FIG. 14.

Referring now also to FIGS. 15 and 16, the azimuth pattern is shown by curves 460 and 462 and the elevation pattern is shown by a curve 466. Useful radiated power is retained up to 50° or so below the wing's surface and peak gain of this radiator is approximately 15 db. It is to be noted that the azimuth pattern parallel to the wing surface is relatively unaffected by the proximity to the surface except for a 6 db attenuation. Although this wedge radiator is shown in the illustrated system, it is to be understood that the principles of the invention are equally applicable to any sort of surface or conventional antenna elements.

Figure 17:
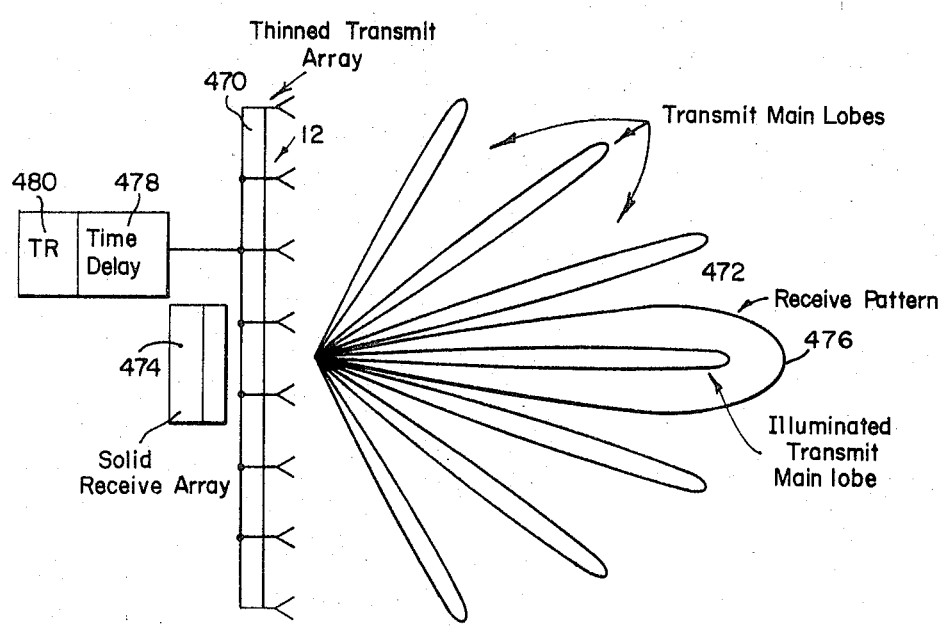
FIG. 17 is a schematic plan view of the transmit and receive antennas and their lobe patterns for a system having a thinned array transmit antenna and a single lobe receive antenna in accordance with the principles of the invention.

Referring now to FIG. 17, an antenna arrangement is shown to illustrate a system in which the transmit antenna may be a thinned array rather than the receive antenna. A transmit antenna 470 provides a transmit pattern 472 and a receive array 474 which may be a single lobe antenna provides a receive lobe 476. In this arrangement if narrow pulses are utilized so that a time delay 478 is required, it is coupled between a transmitter 480 and the various elements or subarrays of the transmit antenna. This arrangement may have the disadvantage that the time delay must be provided at microwave frequenices.

Figure 18:
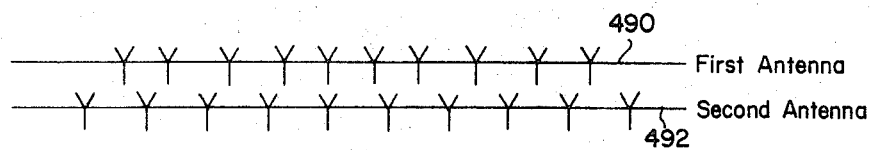
FIG. 18 is a schematic view of first and second thinned arrays for transmitting and receiving either of which may be the transmit antenna having a vernier spacing utilizing the principles in accordance with the invention.
Figure 19:
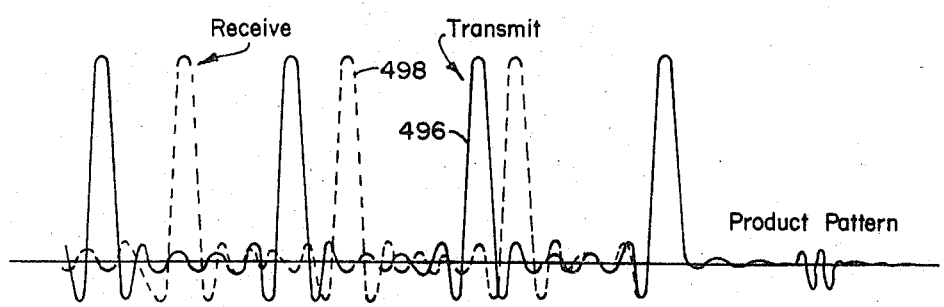
FIG. 19 is a schematic diagram of the transmit and receive antenna lobe patterns for the vernier array of FIG. 18.

Referring now to FIG. 18 which shows an arrangement in which the transmit and receive thinned array antennas may be mounted along the same structure such as an aircraft wing. The spacing of the two antennas are unequal. FIG. 19 shows the patterns of these two thinned arrays. The array with closer elements which may be transmit is shown in solid line; the other array which may be receive is shown in dotted line. The transmit and receive functions may be reversed. If the spacing in the transmit antenna 490 is 90 percent, for example, of the spacing between elements in the receive array 492, and if $\lambda/d > 25/L$ where $d$ is the spacing between elements of the receive array and $L$ is the total width of the receive array, the interferometer lobes such as 496 of the transmit array will not intersect with the receive lobes 498 when scanned within a 60° wide element pattern except at the zeroth order or centerline lobe. The two antennas are pointed in synchronism to provide this effect which is similar to a vernier relationship having a regular scale and a vernier scale grating on a caliper. Since both antennas are electronically scanned, the sidelobe performance of this arrangment is substantially independent of scan angle in that the relative beamwidth and spacing of the transmit and receive arrays is unchanged with scan angle.

Thus, there has been described an improved radar system in which in one arrangement in accordance with the invention the transmit radar forms a conventional sector scanning antenna pattern that illuminates the forward area. The receiving antenna with elements spaced as a thinned array forms a pattern that contains predictable spaced grating lobes. In operation, only one of these grating lobes is illuminated by the transmit pattern while the transmit receive antennas are scanned in synchronism either sequentially or in some jump scan sequence to provide the sector scan display. The resultant radar pattern is a product of the two selected antenna patterns and is arranged so that attenuation of sidelobes is provided. The system concepts are applicable to air to ground as well as air to air, ground to ground and ground to air. The radar can be mounted in aircraft, ships, land vehicles or fixed installations.

I claim:

1. A bistatic radar system comprising:
    a transmit antenna having a single main lobe;
    an extended receive antenna having a plurality of receive antenna elements so as to form a thinned array with spacing between said antenna elements such that the grating lobes thus derived appear substantially at the nulls of said transmit antenna pattern;
    a plurality of radar receiver mixers each responsive to signals received by one of said plurality of antenna elements;
    a plurality of phase shifters each supplying a phase shifted local oscillator signal to each of said radar receiver mixers;
    a plurality of intermediate frequency preamplifiers each responsive to signals from said plurality of radar receiver mixers;
    a corporate feed supplying said local oscillator signal to each of said phase shifters; and
    means coupled between said transmit and receive antenna for synchronizing the pointing directions thereof.

2. The combination of claim 1 wherein said corporate feed supplying said local oscillator signal to each of said phase shifters is constructed of coaxial cable.

3. The combination of claim 1 including local oscillator means and a plurality of phase shifters and mixers with a mixer coupled to each antenna element and a phase shifter coupled between said local oscillator means and each mixer, and including means to control the phase of said plurality of phase shifters.

4. A bistatic radar system comprising:
    a transmit antenna having a single main lobe;
    a thinned array receive antenna including a plurality of sub groups of equal numbers of antenna elements;
    a plurality of radar receiver mixers each coupled to one of said antenna elements;
    a plurality of intermediate frequency preamplifiers each coupled between one of said radar receiver mixers and a line common to one of said sub groups;
    a plurality of phase shifters each coupled to one of said radar receiver mixers;
    a corporate feed supplying a singal from a local oscillator to each of said plurality of phase shifters; and
    a plurality of time delay circuits each responsive to signals appearing on a line common to one of said sub groups and the antenna scan angle.

5. The combination of claim 4 wherein said corporate feed supplying a signal from a local oscillator to each of said plurality of phase shifters is constructed of coaxial cable.

6. The combination of claim 4 wherein said time delay circuits include a plurality of time delay elements coupled through a plurality of switches, said switches being energized as a function of the scan angle of the antenna.

7. A bistatic radar system comprising:
    a phase scanned receive array having a plurality of spaced radiating elements;
    a mechanical scan transmit antenna formed of a parabolic dish having a diameter greater than the spacing between any adjacent two of said plurality of spaced radiating elements;
    and transmitting and receiving means coupled to said receive array and said transmit antenna including means for synchronizing the pointing of said receive array and transmit antenna.

* * * * *